United States Patent
Sano et al.

(10) Patent No.: US 10,742,711 B2
(45) Date of Patent: Aug. 11, 2020

(54) CONTROL DEVICE, CONTROL METHOD, AND COMPUTER-READABLE RECORDING MEDIUM

(71) Applicant: FUJITSU LIMITED, Kawasaki (JP)

(72) Inventors: Takeshi Sano, Hino (JP); Jun Kakuta, Yokohama (JP); Shigeki Fukuta, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 381 days.

(21) Appl. No.: 15/832,180

(22) Filed: Dec. 5, 2017

(65) Prior Publication Data

US 2018/0176283 A1   Jun. 21, 2018

(30) Foreign Application Priority Data

Dec. 21, 2016   (JP) .................. 2016-248460

(51) Int. Cl.
| | | |
|---|---|---|
| *H04L 29/08* | (2006.01) | |
| *G08B 21/12* | (2006.01) | |
| *G05B 15/02* | (2006.01) | |
| *H04L 12/66* | (2006.01) | |
| *G06F 16/00* | (2019.01) | |
| *H04W 4/38* | (2018.01) | |
| *H04L 12/911* | (2013.01) | |

(52) U.S. Cl.
CPC .............. *H04L 67/02* (2013.01); *G05B 15/02* (2013.01); *G06F 16/00* (2019.01); *G08B 21/12* (2013.01); *H04L 12/66* (2013.01); *H04L 47/826* (2013.01); *H04L 67/12* (2013.01); *H04L 67/32* (2013.01); *H04W 4/38* (2018.02)

(58) Field of Classification Search
CPC ........................................................ H04L 67/02
See application file for complete search history.

(56) References Cited

U.S. PATENT DOCUMENTS

| | | |
|---|---|---|
| 2016/0021434 A1 | 1/2016 | Arakawa et al. |
| 2016/0057561 A1 | 2/2016 | Kami |

FOREIGN PATENT DOCUMENTS

| | | |
|---|---|---|
| JP | 2012-195705 | * 10/2012 |
| JP | 2014-209311 | 11/2014 |
| JP | 5641381 | 12/2014 |
| WO | 2012-056551 | 5/2012 |

* cited by examiner

*Primary Examiner* — Manuel A Rivera Vargas
(74) *Attorney, Agent, or Firm* — Fujitsu Patent Center

(57) ABSTRACT

A control device includes a processor. The processor is configured to obtain measurement data from a plurality of devices and predict prediction data of a specified timing using the obtained measurement data. The processor is configured to calculate, for each device, an error between the measurement data and the prediction data. The processor is configured to, based on the error for each device, assign a notification timing for each of such devices for which there is overlapping of timing of notifying the measurement data of the specified timing.

7 Claims, 16 Drawing Sheets

FIG.6

| DEVICE ID | DATA ATTRIBUTE |
|---|---|
| A | REAL-TIME |
| B | REAL-TIME |
| C | NON-REAL-TIME |
| D | NON-REAL-TIME |
| E | NON-REAL-TIME |
| ⋮ | ⋮ |

FIG.7

| DEVICE ID | PREDICTION DIFFICULTY LEVEL |
|---|---|
| A | 0.1 |
| B | 0.9 |
| C | 0.6 |
| D | 0.2 |
| E | 0.4 |
| ⋮ | ⋮ |

CONTROL DEVICE, CONTROL METHOD, AND COMPUTER-READABLE RECORDING MEDIUM

CROSS-REFERENCE TO RELATED APPLICATION

This application is based upon and claims the benefit of priority of the prior Japanese Patent Application No. 2016-248460, filed on Dec. 21, 2016, the entire contents of which are incorporated herein by reference.

FIELD

The embodiments discussed herein are related to a control device, a control method, and a computer-readable recording medium.

BACKGROUND

Regarding a sensor system in which data measured by sensors installed in a plurality of devices is collected, the known examples include an IoT solution for monitoring the flooding of rivers and sewers and an IoT solution for detecting defects in roads and bridges. In a sensor system, there are times when the data in the devices, such as measurement data obtained at the same timing in a plurality of devices, is collected via gateways (GWs) installed near the devices. In that case, in the GWs, as a result of collecting the measurement data obtained at the same timing, there occurs overlapping of notification timings of a plurality of devices thereby causing interference or retransmission of the measurement data from the devices.

In a sensor system, when there is overlapping of the notification timings for notifying the measurement data from a plurality of devices to GWs, the notification timings are time-shared in communication slots of predetermined time intervals, and the notification timing for notifying the measurement data of each device is assigned to one communication slot. With that, data interference or data retransmission between the GWs and the devices is avoided. Besides, in a sensor system, priority is assigned to the devices, and the notification timing of each device is varied according to the priority of that device.

[Patent Literature 1] Japanese Patent No. 5641381
[Patent Literature 2] Japanese Laid-open Patent Publication No. 2014-209311
[Patent Literature 3] International Publication Pamphlet No. 2012/056551
[Patent Literature 4] Japanese Laid-open Patent Publication No. 2012-195705

In a sensor system, when there is overlapping of the notification timings for notifying the measurement data from a plurality of devices to GWs, the notification timing of each device is varied according to the priority of that device. However, in a sensor system, if there is a plurality of devices having the same priority, then it is difficult for the notification timing of each device to be varied, and it is difficult for data interference or data retransmission to be avoided. That results in data loss and data delay.

SUMMARY

According to an aspect of an embodiment, a control device includes a processor. The processor is configured to obtain measurement data from a plurality of devices and predict prediction data of a specified timing using the obtained measurement data. The processor is configured to calculate, for each of the devices, an error between the measurement data and the prediction data. The processor is configured to assign, based on the error for each of the devices, a notification timing for each of such devices for which there is overlapping of timing of notifying the measurement data of the specified timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram illustrating an exemplary configuration of an attribute table;

FIG. 7 is an explanatory diagram illustrating an exemplary configuration of a prediction difficulty level table;

DESCRIPTION OF EMBODIMENTS

Preferred embodiments of the present invention will be explained with reference to accompanying drawings. However, the technology disclosed herein is not limited by the embodiments described below. Moreover, the embodiments described below can be appropriately combined without causing contradiction.

[a] First Embodiment

Figure 1:
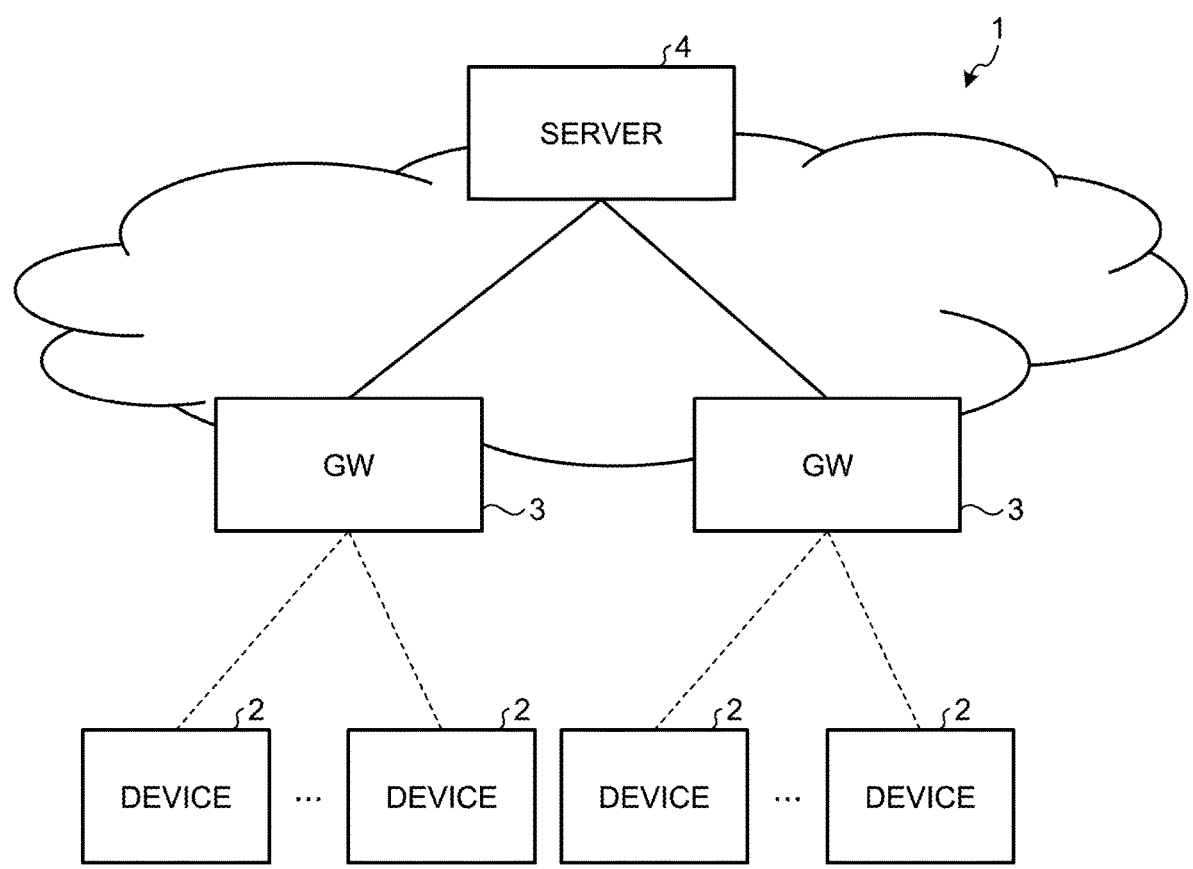
FIG. 1 is an explanatory diagram illustrating an example of a sensor system according to a first embodiment.

FIG. 1 is an explanatory diagram illustrating an example of a sensor system 1 according to a first embodiment. The sensor system 1 illustrated in FIG. 1 includes a plurality of devices 2, a plurality of gateways (GWs) 3, and a server 4. The devices 2 are terminal devices that have a built-in sensor function, and that establish wireless communication with the GWs 3. The GWs 3 are control devices that establish wireless communication with the devices 2, and that establish communication with the server 4 and collect measurement data of the devices 2. The server 4 is an information processing device such as a personal computer that collects measurement data from the devices 2 via the GWs 3. However, the server 4 is not limited to be an information processing device such as a personal computer, and can alternatively be a cloud server, for example.

Figure 2:
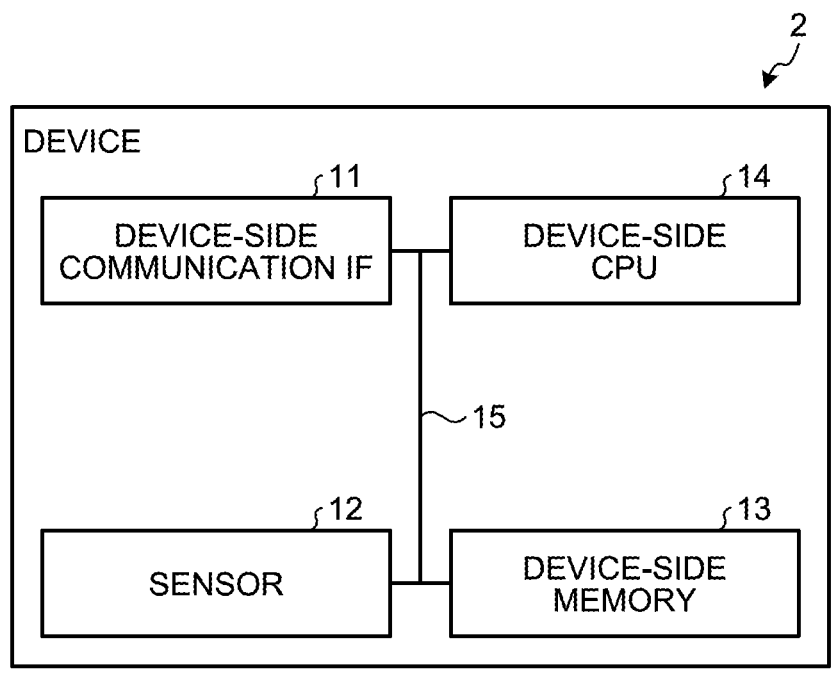
FIG. 2 is an explanatory diagram illustrating an exemplary hardware configuration of a device.

FIG. 2 is an explanatory diagram illustrating an exemplary hardware configuration of the device 2. The device 2 illustrated in FIG. 2 includes a device-side communication interface (IF) 11, a sensor 12, a device-side memory 13, a device-side central processing unit (CPU) 14, and a bus 15. The device-side communication IF 11 is a communication IF for establishing wireless communication with the GW 3. The sensor 12 measures, for example, the river level. The device-side memory 13 is an area for storing a variety of information. The device-side CPU 14 controls the entire device 2. The bus 15 is a path for transmitting information among the device-side communication IF 11, the sensor 12, the device-side memory 13, and the device-side CPU 14.

Figure 3:
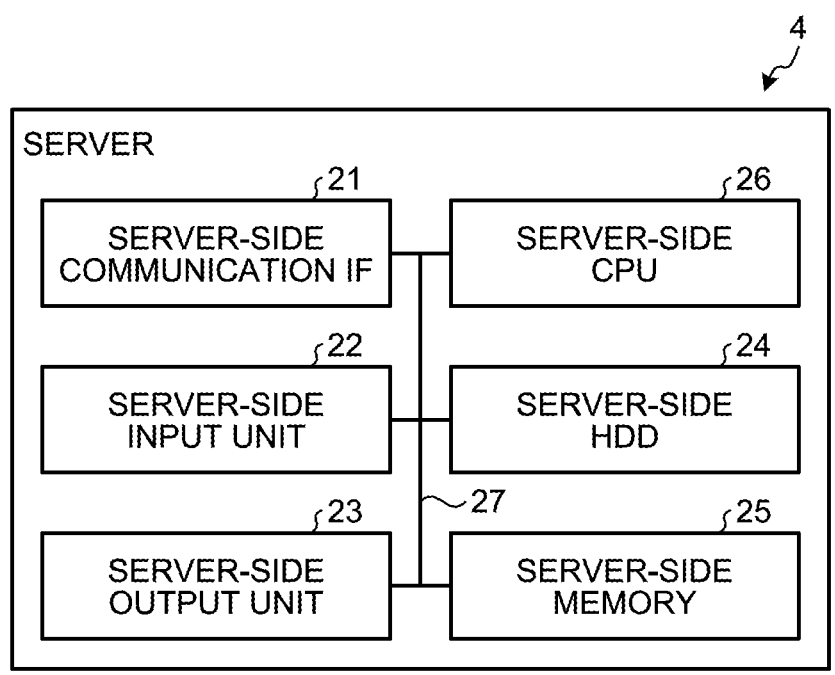
FIG. 3 is an explanatory diagram illustrating an exemplary hardware configuration of a server.

FIG. 3 is an explanatory diagram illustrating an exemplary hardware configuration of the server 4. The server 4 illustrated in FIG. 3 includes a server-side communication IF 21, a server-side input unit 22, a server-side output unit 23, a server-side hard disk drive (HDD) 24, a server-side memory 25, a server-side CPU 26, and a bus 27. The server-side communication IF 21 is a communication IF for establishing communication with the GWs 3. The server-side input unit 22 is, for example, an input IF such as an operating unit. The server-side output unit 23 is, for example, an output IF such as a display unit. The server-side HDD 24 is an area for storing a variety of information. The server-side memory 25 includes an area for storing a variety of information and includes a work area in which the server-side CPU 26 loads a variety of information to be executed. The server-side CPU 26 controls the entire server 4. The bus 27 is a path for transmitting information among the server-side communication IF 21, the server-side input unit 22, the server-side output unit 23, the server-side HDD 24, the server-side memory 25, and the server-side CPU 26.

Figure 4:
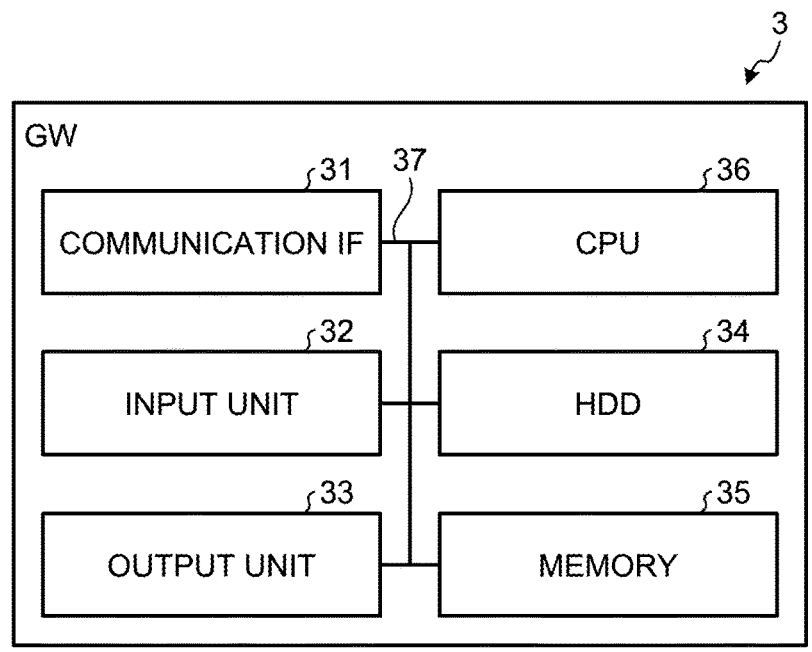
FIG. 4 is an explanatory diagram illustrating an exemplary hardware configuration of a gateway (GW)

FIG. 4 is an explanatory diagram illustrating an exemplary hardware configuration of the GW 3. The GW 3 illustrated in FIG. 4 includes a communication IF 31, an input unit 32, an output unit 33, an HDD 34, a memory 35, a CPU 36, and a bus 37. The communication IF 31 is a communication IF that establishes wireless communication with the devices 2, and that establishes communication with the server 4. The input unit 32 is, for example, an input IF such as an operating unit. The output unit 33 is, for example, an output IF such as a display unit. The HDD 34 is an area for storing a variety of information. The memory 35 includes an area for storing a variety of information such as computer programs and includes a work area in which the CPU 36 loads a variety of information to be executed. The CPU 36 controls the entire GW 3. The CPU 36 loads computer programs that are stored in the memory 35, and executes processes as processing functions corresponding to the computer programs. The bus 37 is a path for transmitting information among the communication IF 31, the input unit 32, the output unit 33, the HDD 34, the memory 35, and the CPU 36.

Figure 5:
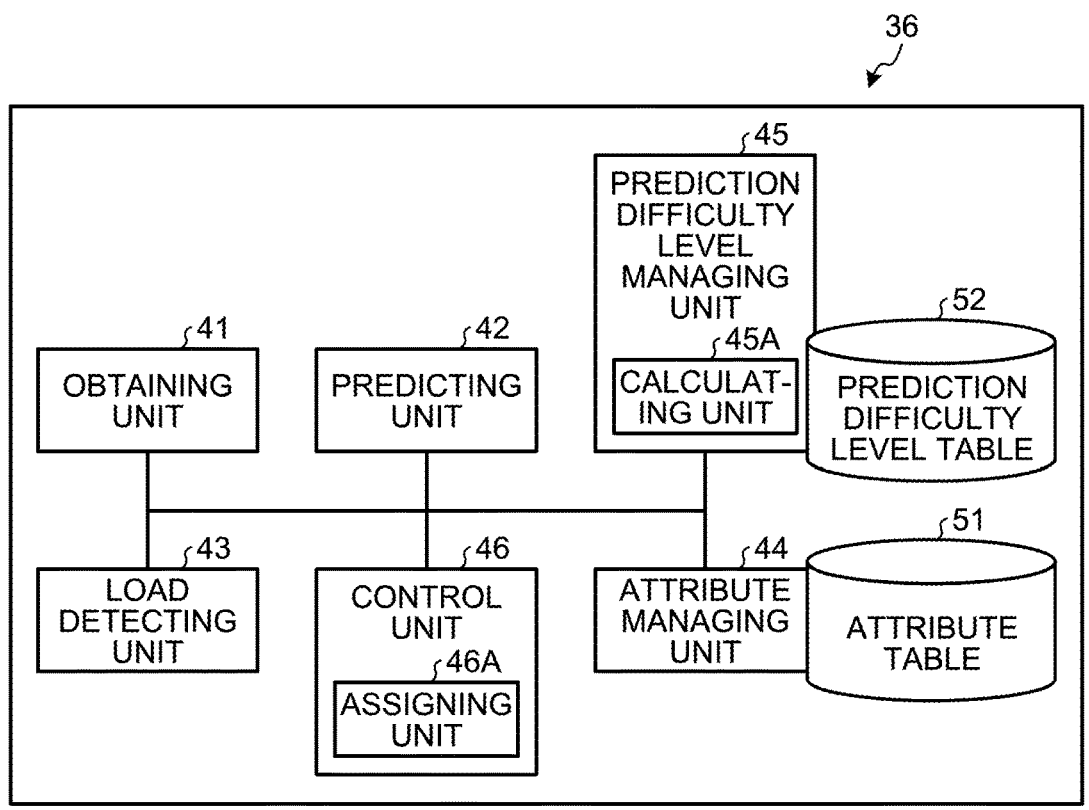
FIG. 5 is an explanatory diagram illustrating an exemplary functional configuration of a central processing unit (CPU) of the GW.

FIG. 5 is an explanatory diagram illustrating an exemplary functional configuration of the CPU 36 of the GW 3. The CPU 36 includes an obtaining unit 41, a predicting unit 42, a load detecting unit 43, an attribute managing unit 44, a prediction difficulty level managing unit 45, and a control unit 46. The memory 35 is used to store an attribute table 51 and a prediction difficulty level table 52. The obtaining unit 41 collects measurement data, such as measurement values (actual measurement data) and measurement timings, from the devices 2 at predetermined notification timings. The predicting unit 42 calculates prediction data of a specified timing based on, for example, the actual measurement data of the specified timing and the past actual measurement data of the specified timings. Herein, the specified timing is, for example, the measurement timing specified in an application (described later). The prediction data represents the predicted measurement data of the actual measurement data of the specified timing as predicted before the specified timing. The predicting unit 42 performs regression analysis of the measurement data of the past specified timings as collected for each device ID, and calculates the prediction data of the specified timing. The load detecting unit 43 monitors, for example, the number of devices 2 for which the notification timings overlap at the specified timing.

The attribute managing unit 44 stores data attributes of each device 2 in the attribute table 51. The data attributes represent information enabling identification of the attributes, such as real-time attributes and non-real-time attributes, of the data of the devices 2. FIG. 6 is an explanatory diagram illustrating an exemplary configuration of the attribute table 51. In the attribute table 51 illustrated in FIG. 6, device IDs 51A and data attributes 51B are stored in a corresponding manner. The device IDs 51A are IDs enabling identification of the devices 2. The data attributes 51B are data attributes enabling identification of the attributes, such as real-time attributes or non-real-time attributes, of the measurement data measured by the devices 2.

The prediction difficulty level managing unit 45 calculates a prediction difficulty level for each device 2 and stores it in the prediction difficulty level table 52. The prediction difficulty level managing unit 45 includes a calculating unit 45A, which calculates the prediction difficulty level as the error between the actual measurement data and the prediction data. Herein, the calculating unit 45A implements the root-mean-square error with respect to the prediction data at the specified timing and the actual measurement data at the specified timing, and calculates the error rate using Equation 1.

[Equation 1]

$$f(x) = \sqrt{\frac{\sum_{i=1}^{n}(p_i - d_i)^2}{n}} \quad (1)$$

$\begin{pmatrix} p_i: \text{PREDICTED VALUE AT } i-TH \text{ TIME,} \\ d_i: \text{ACTUAL MEASUREMENT VALUE AT } i-TH \text{ TIME} \end{pmatrix}$ FIG. 7 is an explanatory diagram illustrating an exemplary configuration of the prediction difficulty level table 52. In the prediction difficulty level table 52 illustrated in FIG. 7, device IDs 52A and prediction difficulty levels 52B are stored in a corresponding manner. The device IDs 52A are IDs enabling identification of the devices 2. The prediction difficulty levels 52B are indicators represented by the error rates between the actual measurement data and the prediction data of the devices 2. The control unit 46 includes an assigning unit 46A, which assigns the notification timing of each device 2 to an available communication slot (hereinafter, called a slot) based on the data attributes of that device 2. An available slot represents a communication timing obtained by time-sharing of the transmission period, which is used for transmitting measurement data to the GW 3, into a predetermined time interval for each device 2. The available slot assigned to each device 2 represents the notification timing at which that device 2 transmits the measurement data to the GW 3.

Figure 8:
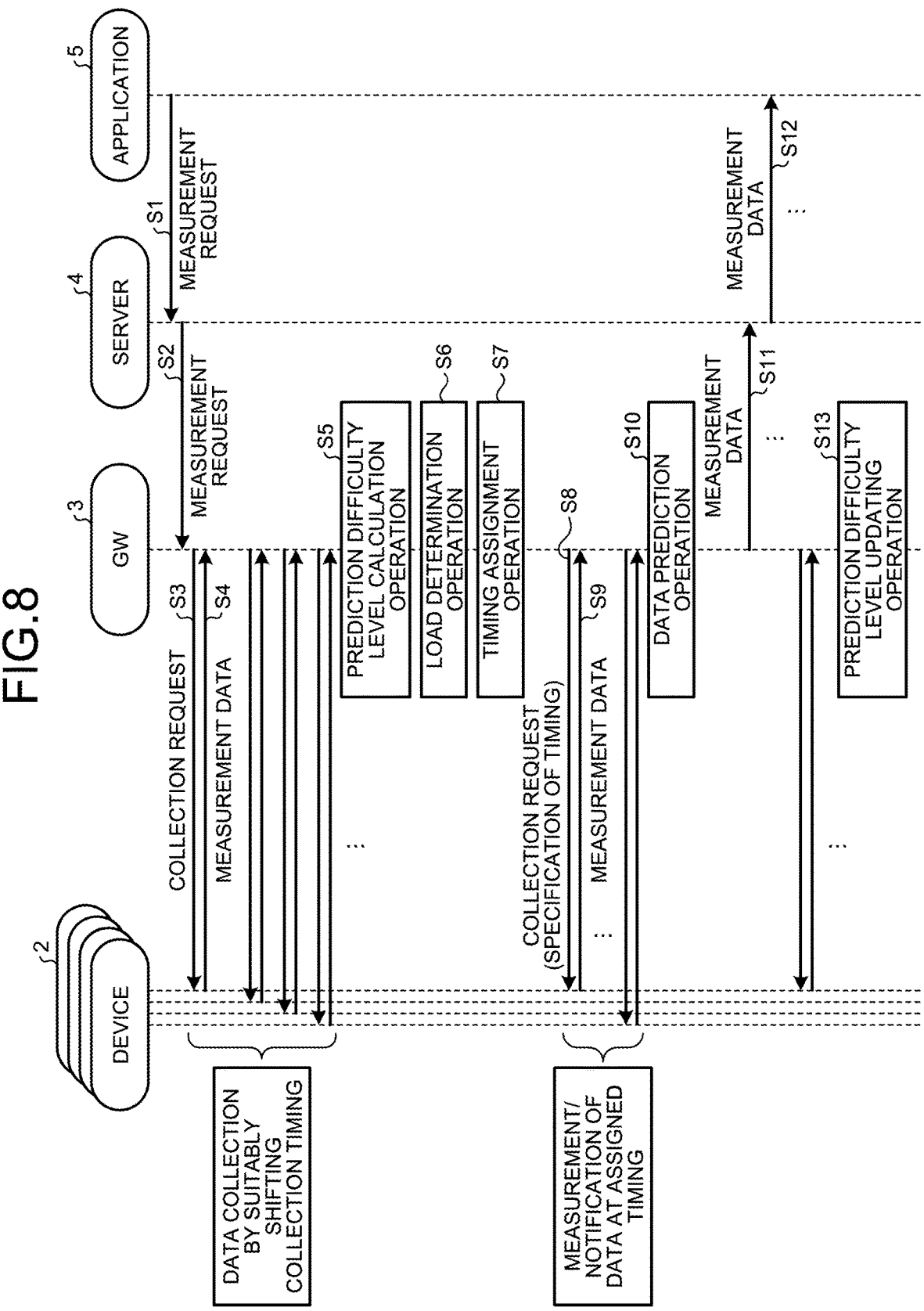
FIG. 8 is an explanatory diagram illustrating an example of the operations performed in the sensor system.

Given below is the explanation of operations performed in the sensor system 1 according to the first embodiment. FIG. 8 is an explanatory diagram illustrating an example of the operations performed in the sensor system 1. The sensor system 1 includes an application 5, which accesses the server 4, in addition to including a plurality of devices 2, a plurality of GWs 3, and the server 4. The application 5 notifies the server 4 about a measurement request issued with respect to the devices 2 (Step S1). The measurement request includes the device IDs enabling identification of the devices 2 in which measurement is to be performed, the specified timings indicating the timings at which measurement is to be performed, the measurement frequency, and data attributes indicating the attributes of measurement data; and represents a command for requesting the devices 2 to perform a measurement operation. In response to the measurement request received from the application 5, the server 4 notifies the concerned GW 3 about the measurement request (Step S2). In response to the measurement request, the obtaining unit 41 of the concerned GW 3 issues a collection request to the devices 2 (Step S3). Herein, the collection request represents a command for requesting the devices 2 to collect measurement data. In response to the collection request received from the GW 3, each device 2 notifies the GW 3 about the measurement data (Step S4).

The prediction difficulty level managing unit 45 of the GW 3 performs a prediction difficulty level calculation operation for calculating the prediction difficulty level of each device 2 based on the actual measurement data and the prediction data of that device 2 (Step S5). The load detecting unit 43 of the GW 3 determines whether or not overlapping of the notification timing at the specified timing has occurred for more than a predetermined number of devices 2. That is, the load detecting unit 43 performs a load determination operation for determining the degree of congestion of the notification timings (Step S6).

If the load determination operation indicates that overlapping of the notification timing at the specified timing has occurred for more than the predetermined number of devices 2, then the control unit 46 of the GW 3 performs a first timing assignment operation for assigning a notification timing to each device 2 (Step S7). Subsequently, the control unit 46 notifies each device 2 about a collection request including the notification timing assigned to that device 2 during the first timing assignment operation (Step S8). Meanwhile, the notification timing is represented by the measurement timing of the sensor 12 of the concerned device 2 and by a slot number that enables identification of the slot used at the time of notifying the GW 3 about the measurement data of the concerned device 2. Thus, based on the notification timing, each device 2 measures data using the sensor 12. Moreover, based on the notification timing obtained from the GW 3, each device 2 notifies the GW 3 about the measurement data (Step S9).

When the measurement data is received from the devices 2, the GW 3 performs a data prediction operation in which prediction data at the specified timing is predicted using the measurement data before the specified timing, using the measurement data after the specified timing, and using history data obtained till that point of time (Step S10). Then, the GW 3 notifies the server 4 about the prediction data; and, in the case of the measurement data after the specified timing, notifies the server 4 about the measurement data measured at the specified timing (Step S11). Subsequently, the server 4 notifies the application 5 about the measurement data and the prediction data for each device 2 as received from the GW 3 (Step S12). Then, the GW 3 performs a prediction difficulty level updating operation for updating the prediction difficulty level for each device 2 (Step S13).

Figure 9:
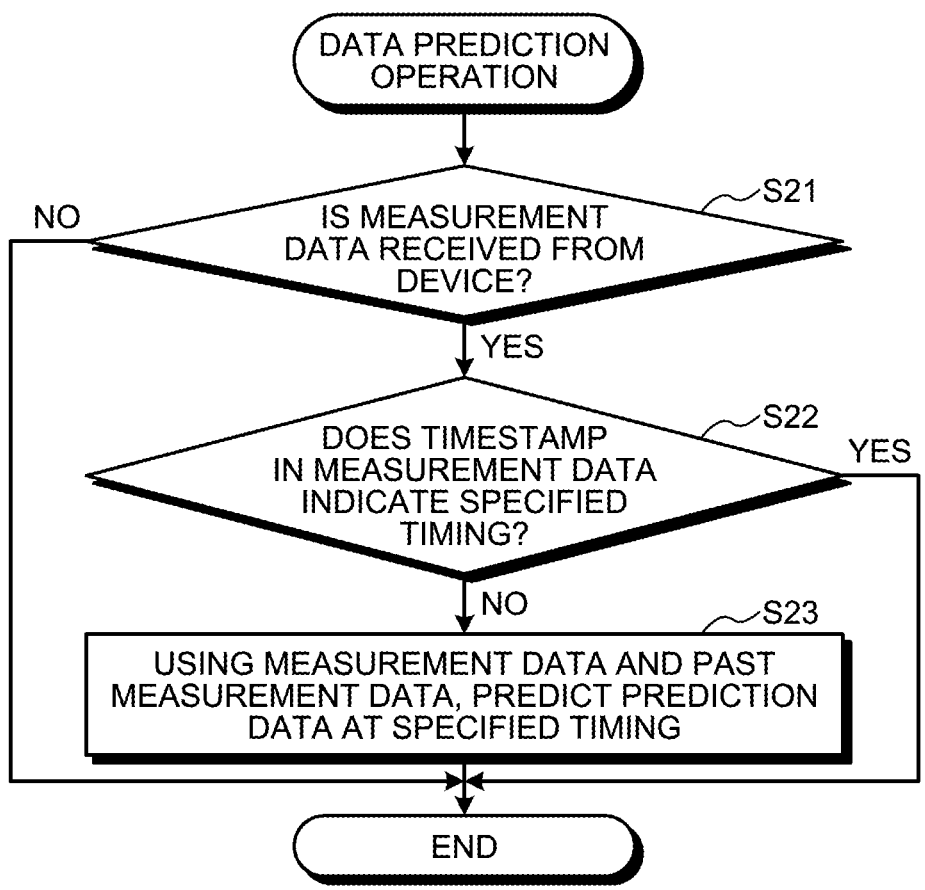
FIG. 9 is a flowchart for explaining an example of the operations that are related to a data prediction operation and that are performed by the CPU of the GW.

FIG. 9 is a flowchart for explaining an example of the operations that are related to the data prediction operation and that are performed by the CPU 36 of the GW 3. In the CPU 36 of the GW 3, the obtaining unit 41 determines whether or not the measurement data has been received from the concerned device 2 (Step S21). Meanwhile, the measurement data contains the measurement value that is measured by the sensor 12 of the concerned device 2, and contains a time stamp indicating the measurement timing of the concerned device 2. If the measurement data has been received (Yes at Step S21), the obtaining unit 41 determines whether or not the timestamp in the measurement data indicates the specified timing (Step S22). Herein, the specified timing represents the target timing for measurement as specified by the application 5.

If the timestamp in the measurement data indicates the specified timing (Yes at Step S22), then it marks the end of the operations illustrated in FIG. 9. However, if the timestamp in the measurement data does not indicate the specified timing (No at Step S22), then the predicting unit 42 predicts the prediction data at the specified timing using the received measurement data and using the measurement data at the past specified timings (Step S23). That marks the end of the operations illustrated in FIG. 9. Meanwhile, if the measurement data is not received from the device 2 (No at Step S21), it marks the end of the operations illustrated in FIG. 9.

Upon receiving the measurement data from the device 2, if the timestamp in the measurement data does not indicate the specified timing, the GW 3 generates prediction data at the specified timing using the measurement data and using the measurement data at the past specified timings. As a result, the measurement data at the specified timing can be predicted before the specific timing.

Figure 10:
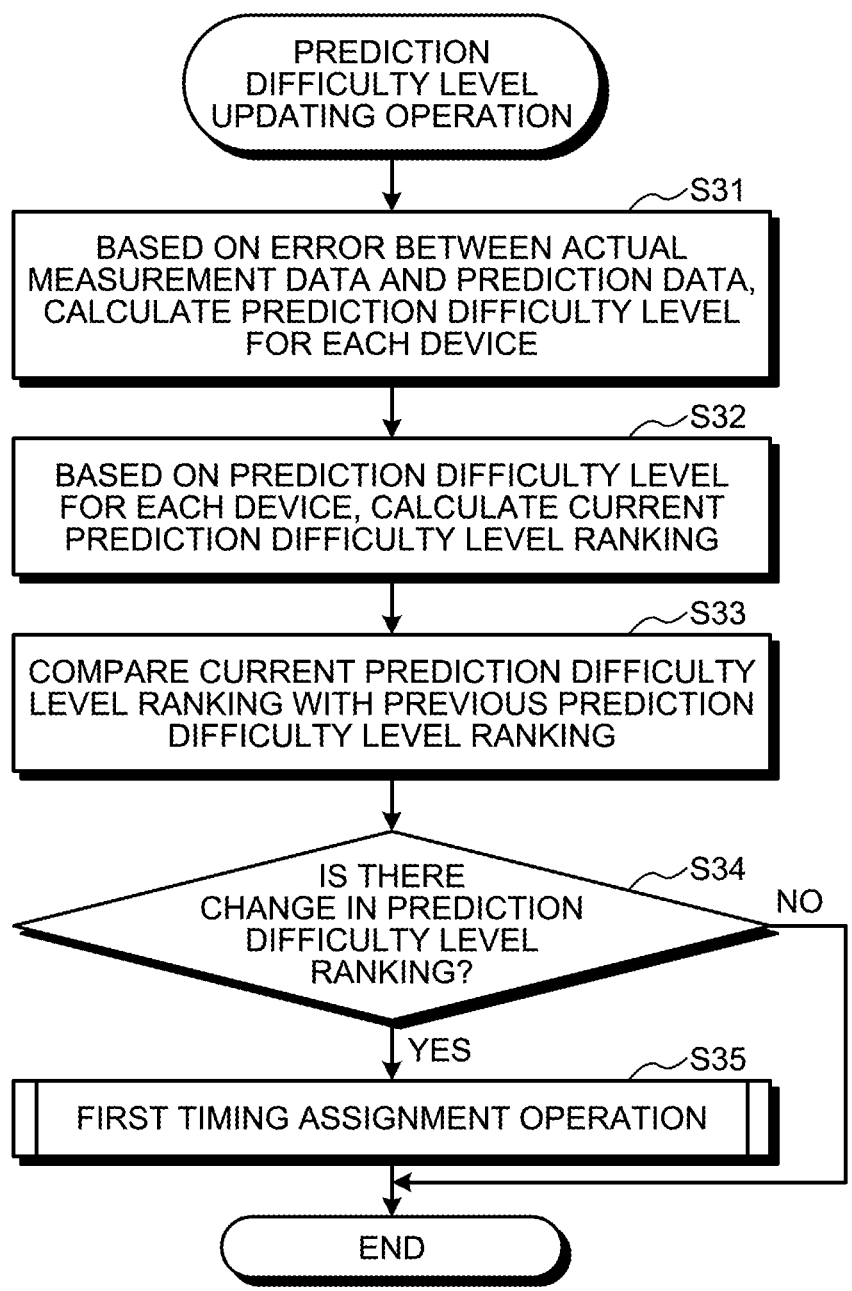
FIG. 10 is a flowchart for explaining an example of the operations that are related to a prediction difficulty level updating operation and that are performed by the CPU of the GW.

FIG. 10 is a flowchart for explaining an example of the operations that are related to the prediction difficulty level updating operation and that are performed by the CPU 36 of the GW 3. In the CPU 36, the prediction difficulty level managing unit 45 calculates the prediction difficulty level for each device 2 based on the error rate of the actual measurement data and the prediction data in that device 2 (Step S31), and registers the prediction difficulty level for each device 2 in the prediction difficulty level table 52.

Then, the prediction difficulty level managing unit 45 refers to the prediction difficulty level table 52 and, based on the prediction difficulty level for each device 2, calculates the current prediction difficulty level ranking for the devices 2 (Step S32). Herein, the prediction difficulty level ranking represents the ranking in the order from the device 2 having the highest prediction difficulty level to the device 2 having the lowest prediction difficulty level. Then, the prediction difficulty level managing unit 45 compares the current prediction difficulty level ranking with the previous prediction difficulty level ranking (Step S33). Meanwhile, it is assumed that the prediction difficulty level table 52 is used not only to manage the current prediction difficulty levels but also to manage the prediction difficulty levels in the past.

Based on the comparison result, the prediction difficulty level managing unit 45 determines whether or not there are changes in the current prediction difficulty level ranking (Step S34). If there are changes in the current prediction difficulty level ranking (Yes at Step S34), then the prediction difficulty level managing unit 45 performs a first timing assignment operation for updating the communication timing of each device 2 (Step S35). It marks the end of the operations illustrated in FIG. 10. On the other hand, if there are no changes in the current prediction difficulty level ranking (No at Step S34), then it marks the end of the operations illustrated in FIG. 10.

The GW 3 compares the current prediction difficulty level ranking with the previous prediction difficulty level ranking and, if there are changes in the current prediction difficulty level ranking, assigns the notification timing for each device 2 based on the current prediction difficulty level ranking. Thus, the notification timing for each device 2 can be varied according to the prediction difficulty level ranking.

Figure 11:
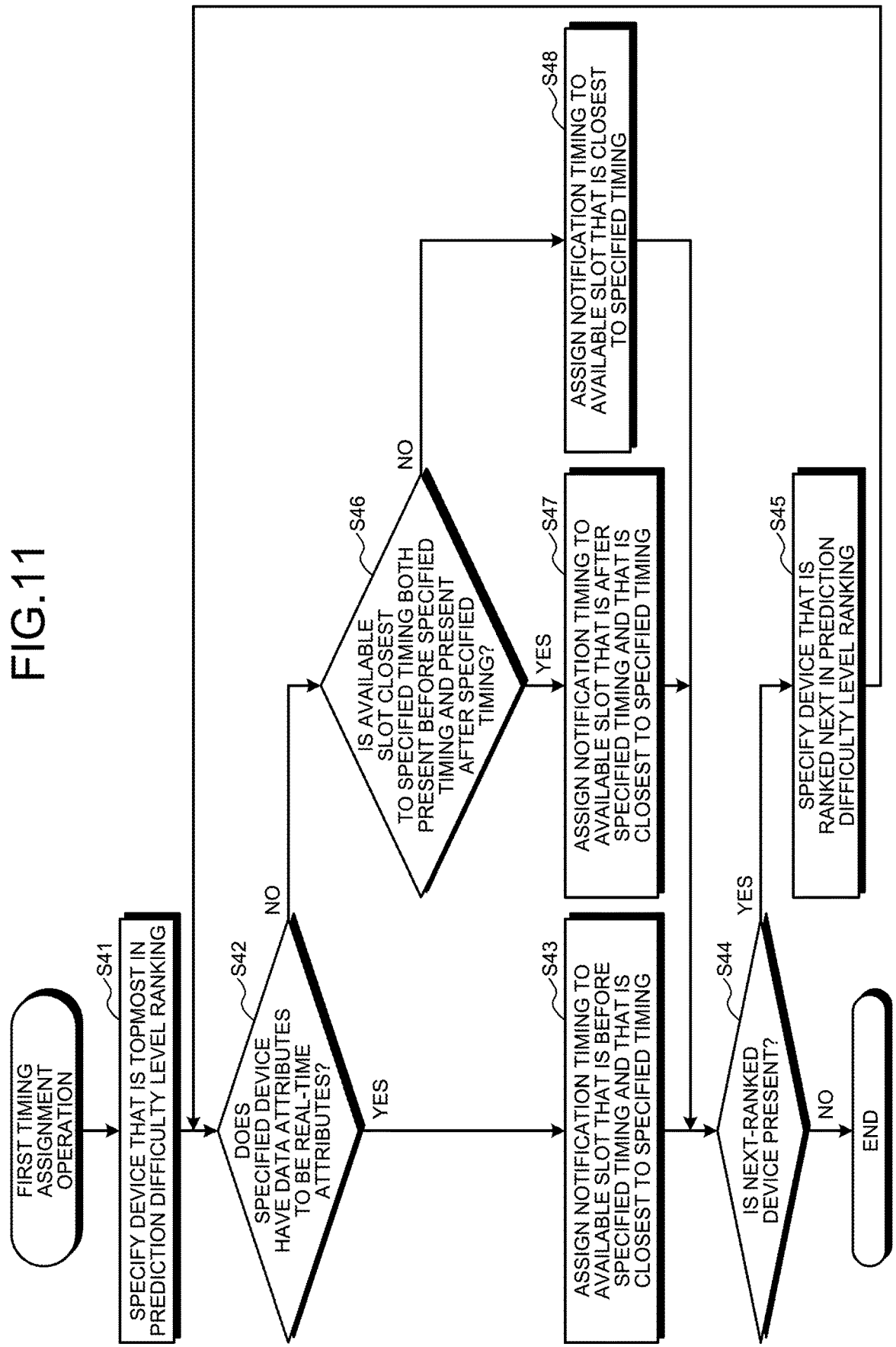
FIG. 11 is a flowchart for explaining an example of the operations that are related to a first timing assignment operation and that are performed by the CPU of the GW.

FIG. 11 is a flowchart for explaining an example of the operations that are related to the first timing assignment operation and that are performed by the CPU 36 of the GW 3. With reference to FIG. 11, in the control unit 46 of the CPU 36 of the GW 3, the assigning unit 46A specifies the device 2 that is topmost in the prediction difficulty level ranking (Step S41). The assigning unit 46A refers to the attribute table 51 and determines whether or not the data attributes of the specified device 2 are real-time attributes (Step S42). If the data attributes of the specified device 2 are real-time attributes (Yes at Step S42), then the assigning unit 46A assigns the notification timing of the specified device 2 to the available slot that is before the specified timing as well as closest to the specified timing (Step S43). Subsequently, the assigning unit 46A determines whether or not the device 2 ranked next in the prediction difficulty level ranking is present (Step S44).

If the device 2 ranked next in the prediction difficulty level ranking is present (Yes at Step S44), then the assigning unit 46A specifies the device 2 ranked next in the prediction difficulty level ranking (Step S45), and the system control returns to Step S42 for determining whether or not the data attributes of the specified device 2 are real-time attributes.

Meanwhile, if the data attributes of the specified device 2 are not real-time attributes (No at Step S42), then the assigning unit 46A determines whether or not the available slot closest to the specified timing is both present before the specified timing and present after the specified timing (Step S46). If such an available slot is both present before the specified timing and present after the specified timing (Yes at Step S46), then the assigning unit 46A assigns the notification timing of the specified device 2 to the available slot that is after the specified timing as well as closest to the specified timing (Step S47). Then, the system control returns to Step S44, and the assigning unit 46A determines whether or not the next-ranked device 2 is present.

Meanwhile, if the available slot is not both present before the specified timing and present after the specified timing (No at Step S46), then the assigning unit 46A assigns the notification timing of the specified device 2 to the available slot that is closest to the specified timing (Step S48), and the system control returns to Step S44 for determining whether or not the next-ranked device 2 is present. If the device 2 ranked next in the prediction difficulty level ranking is not present (No at Step S44), then it marks the end of the operations illustrated in FIG. 11.

When the specified device 2 has a high prediction difficulty level and when the data attributes of the specified device 2 are real-time attributes, the GW 3 assigns the notification timing of the specified device 2 to the available slot that is before the specified timing as well as closest to the specified timing. As a result, when the specified device 2 has a high prediction difficulty level and when the data attributes are real-time attributes, measurement is performed before the specified timing but at a timing that is as close to the specified timing as possible, thereby making it possible to secure highly accurate measurement data.

When the data attributes of the specified device 2 are non-real-time attributes and when the available slot closest to the specified timing is both present before the specified timing and present after the specified timing, the GW 3 assigns the notification timing of the specified device 2 to the available slot that is after the specified timing as well as closest to the specified timing. As a result, since the data attributes of the device 2 are non-real-time attributes, it becomes possible to secure the notification timing that is after the specified timing and that is as close to the specified timing as possible.

When the data attributes of the specified device 2 are non-real-time attributes and when the available slot closest to the specified timing is not both present before the specified timing and present after the specified timing, the GW 3 assigns the notification timing of the specified device 2 to the available slot that is closest to the specified timing. That makes it possible to secure a notification timing that is close to the specified timing.

Figure 12:
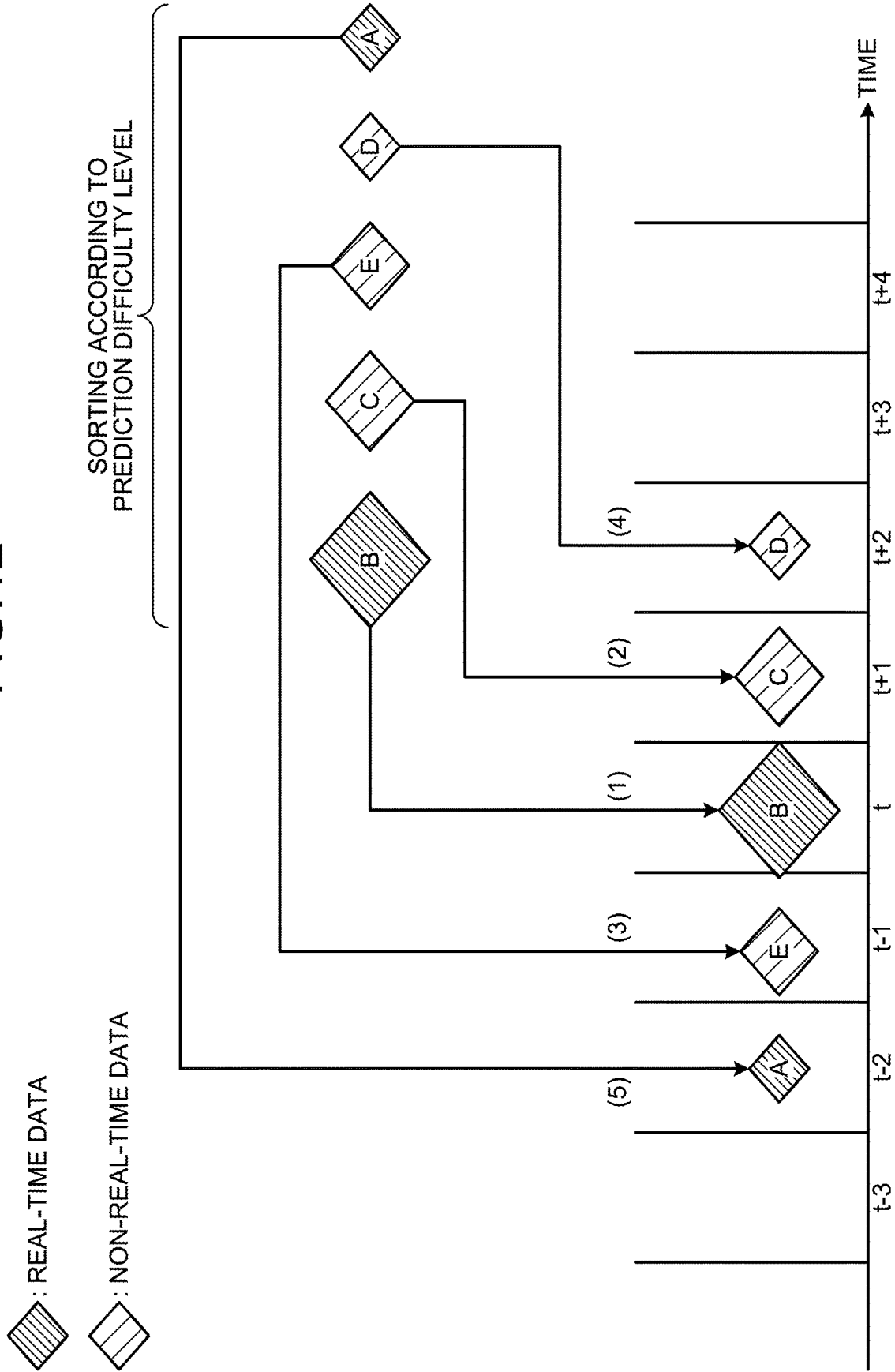
FIG. 12 is an explanatory diagram illustrating an example of a timing assignment operation performed by each device according to the first embodiment.

FIG. 12 is an explanatory diagram illustrating an example of a timing assignment operation performed by each device 2 according to the first embodiment. Herein, for the purpose of illustration, the data attributes of devices A and B are assumed to be real-time attributes and the data attributes of devices C, D, and E are assumed to be non-real-time attributes. Moreover, regarding the prediction difficulty level ranking, it is assumed that the device B is topmost in the prediction difficulty level ranking that is in the order of the devices B, C, E, D, and A in that order.

The GW 3 performs a first timing assignment operation for assigning the notification timing to the device 2 that has the highest prediction difficulty level and that has the data attributes to be real-time attributes; and assigns the notification timing of the device B to the available slot at a specified timing t. Herein, the slot number of the device B is referred to as "t". Moreover, the GW 3 assigns the notification timing of the device C to the available slot at the specified timing t+1. Herein, the slot number of the device C is referred to as "t+1". Furthermore, the GW 3 assigns the notification timing of the device E to the available slot at the specified timing t−1. Herein, the slot number of the device E is assumed to be t−1. Moreover, the GW 3 assigns the notification timing of the device D to the available slot at the specified timing t+2. Herein, the slot number of the device D is assumed to be t+2. Furthermore, the GW 3 assigns the notification timing of the device A to the available slot at the specified timing t−2. Herein, the slot number of the device A is assumed to be t−2.

In the sensor system 1 according to the first embodiment, data interference or data retransmission can be avoided, and the measurement data at the specified timing can be predicted with high accuracy and can be provided to the application 5. That enables achieving prevention of data loss and data delay. Besides, in the sensor system 1, even if a plurality of devices 2 has the same priority, data interference or data retransmission can be avoided, and the measurement data at the specified timing can be predicted with high accuracy and can be provided to the application 5.

When the specified device 2 has a high prediction difficulty level and when the data attributes of the specified device 2 are real-time attributes, the GW 3 assigns the notification timing of the specified device 2 to the available slot that is before the specified timing as well as closest to the specified timing. As a result, when the specified device 2 has a high prediction difficulty level and when the data attributes of the specified device 2 are real-time attributes, it becomes possible to secure the notification timing that is before the specified timing and that is as close to the specified timing as possible.

When the data attributes of the specified device 2 are non-real-time attributes, the GW 3 assigns the notification timing of the specified device 2 to the available slot that is after the specified timing as well as closest to the specified timing. As a result, since the data attributes of the device 2 are non-real-time attributes, it becomes possible to secure the notification timing that is after the specified timing and that is as close to the specified timing as possible.

Meanwhile, in the first embodiment, the explanation is given for a case in which the devices 2 do not include a memory medium. Regarding an embodiment for a case in which the devices 2 include a memory medium, a second embodiment is described below. In the second embodiment, the constituent elements identical to the constituent elements of the sensor system 1 according to the first embodiment are referred to by the same reference numerals, and the explanation of the same configuration and the same operations is not repeated.

[b] Second Embodiment

Figure 13:
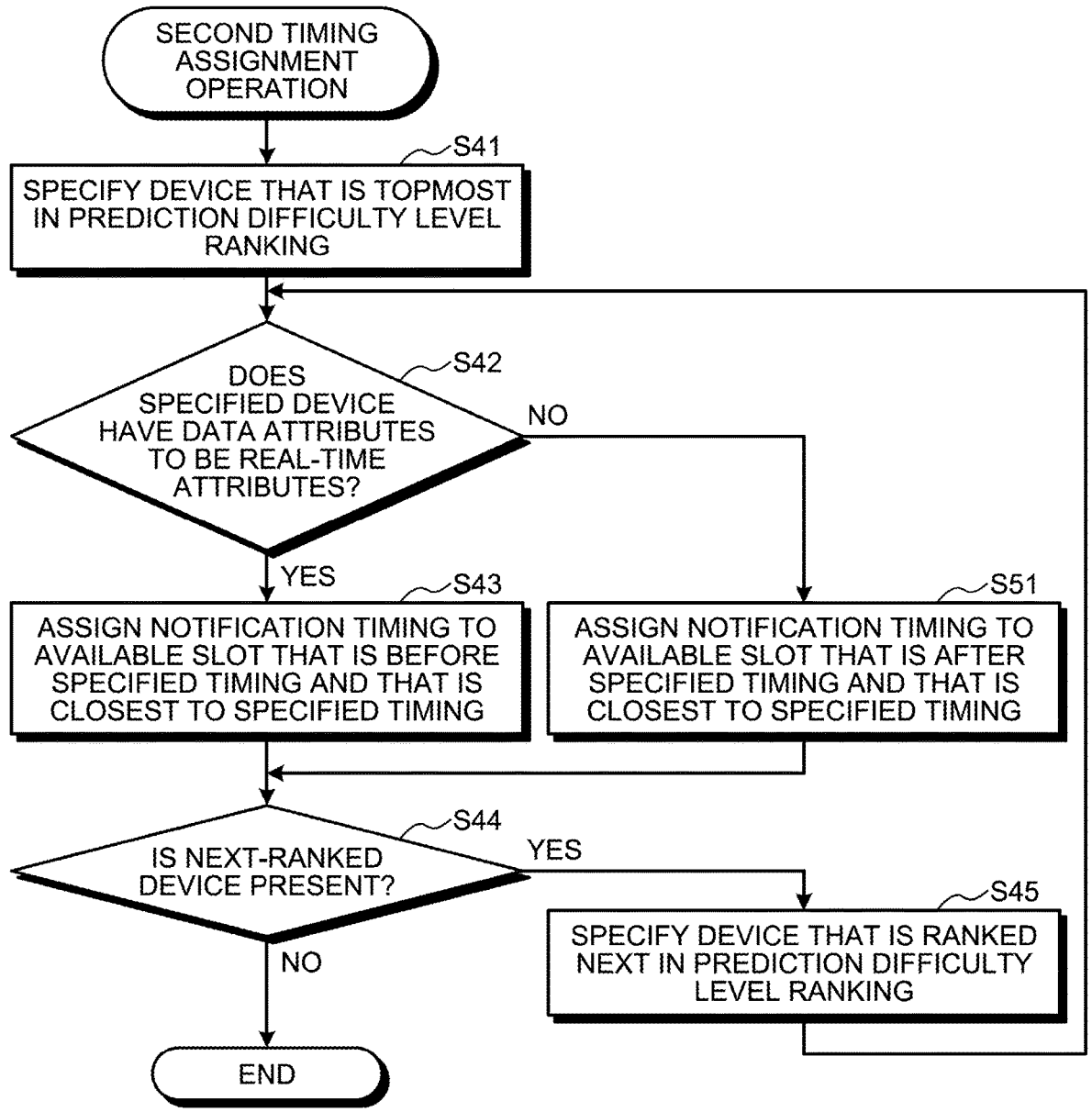
FIG. 13 is a flowchart for explaining an example of the operations that are related to a second timing assignment operation according to a second embodiment and that are performed by the CPU of the GW.

According to the second embodiment, each device 2 has a built-in memory medium, and thus the measurement values measured by the sensor 12 can be stored in the memory medium. FIG. 13 is a flowchart for explaining an example of the operations that are related to a second timing assignment operation according to the second embodiment and that are performed by the CPU 36 of the GW 3. With reference to FIG. 13, if the data attributes of the specified device 2 are not real-time attributes (No at Step S42), then the assigning unit 46A in the CPU 36 of the GW 3 assigns the notification timing of the specified device 2 to the available slot that is after the specified timing as well as closest to the specified timing (Step S51). Then, the system control returns to Step S44, and the assigning unit 46A determines whether or not the next-ranked device 2 is present.

When the data attributes of the specified device 2 are non-real-time attributes, the GW 3 assigns the notification timing of the specified device 2 to the available slot that is after the specified timing as well as closest to the specified timing. As a result, it becomes possible to secure the notification timing that is after the specified timing as well as closest to the specified timing.

If the data attributes of the specified device 2 are real-time attributes; then, based on the prediction difficulty level ranking, the GW 3 assigns the notification timing of the specified device 2 to the available slot that is before the specified timing as well as closest to the specified timing. As a result, it becomes possible to secure the notification timing that is before the specified timing as well as closest to the specified timing.

Figure 14:
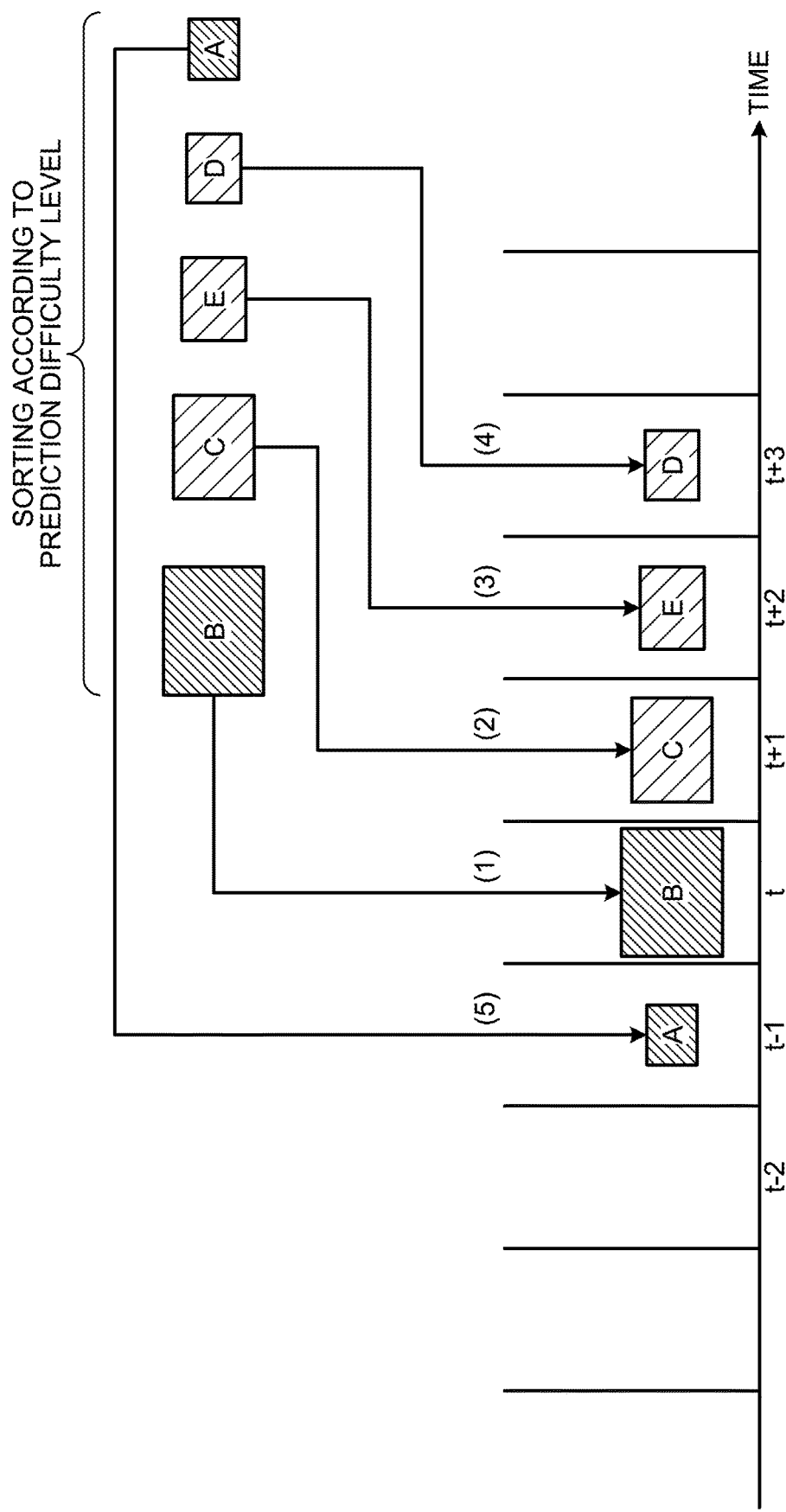
FIG. 14 is an explanatory diagram illustrating an example of a timing assignment operation performed by each device according to the second embodiment.

FIG. 14 is an explanatory diagram illustrating an example of a timing assignment operation performed by each device 2 according to the second embodiment. Herein, for the purpose of illustration, it is assumed that the devices A and B have the data attributes to be real-time attributes and have a built-in memory medium. Moreover, it is assumed that the devices C, D, and E have the data attributes to be non-real-time attributes and have a built-in memory medium. Furthermore, the prediction difficulty level ranking is assumed to be in the order of the devices B, C, E, D, and A. Herein, since each of the devices A to E has a built-in memory medium, the measurement data measured by the corresponding sensor 12 can be stored in the corresponding memory medium.

The GW 3 performs the second timing assignment operation and assigns the notification timing of the device B to the available slot at the specified timing t, and assigns the notification timing of the device C to the available slot at the specified timing t+1. Moreover, the GW 3 assigns the notification timing of the device E to the available slot at the specified timing t+2. Furthermore, the GW 3 assigns the notification timing of the device D to the available slot at the specified timing t+3. Moreover, the GW 3 assigns the notification timing of the device A to the available slot at the specified timing t−1.

In the second embodiment, when the specified device 2 includes a memory medium and has the data attributes to be non-real-time attributes, the GW 3 assigns the notification timing of the specified device 2 to the available slot that is after the specified timing as well as closest to the specified timing. As a result, it becomes possible to secure the notification timing that is after the specified timing as well as closest to the specified timing. That enables achieving prevention of data loss and data delay.

If the specified device 2 includes a memory medium and has the data attributes to be real-time attributes; then, based on the prediction difficulty level ranking, the GW 3 assigns the notification timing of the specified device 2 to the available slot that is before the specified timing as well as closest to the specified timing. As a result, it becomes possible to secure the notification timing that is before the specified timing as well as closest to the specified timing.

In the first embodiment described earlier, the explanation is given about the devices 2 not including a memory medium. In the second embodiment described above, the explanation is given about the devices 2 including a memory medium. Regarding an embodiment of the sensor system 1 for a case in which some of the devices 2 include a memory medium and some of the devices 2 do not include a memory medium, a third embodiment is described below. In the third embodiment, the constituent elements identical to the constituent elements of the sensor system 1 according to the first and second embodiments are referred to by the same reference numerals, and the explanation of the same configuration and the same operations is not repeated.

[c] Third Embodiment

Figure 15:
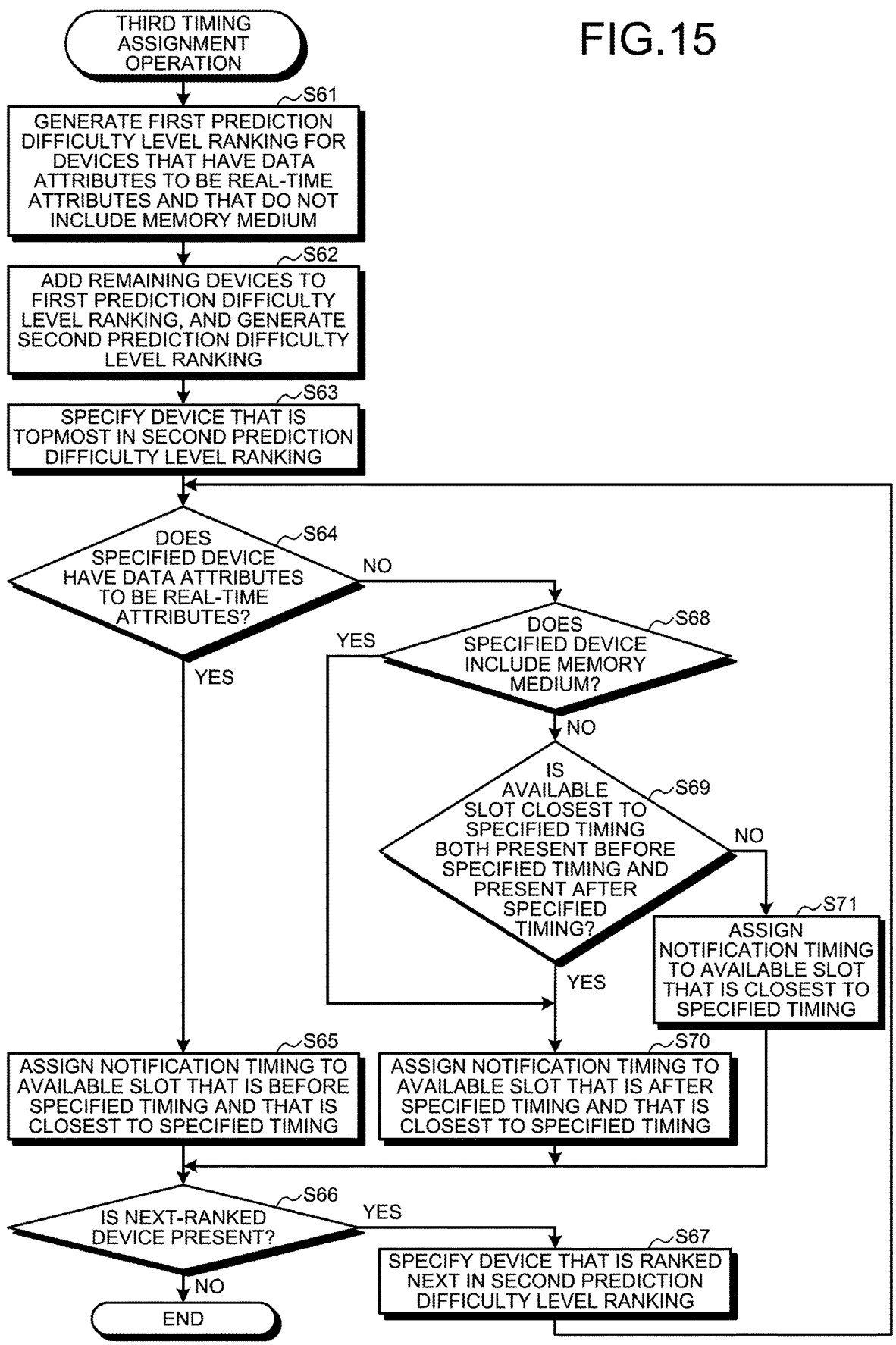
FIG. 15 is a flowchart for explaining an example of the operations that are related to a third timing assignment operation and that are performed by the CPU of the GW.

FIG. 15 is a flowchart for explaining an example of the operations that are related to a third timing assignment operation and that are performed by the CPU 36 of the GW 3. With reference to FIG. 15, in the CPU 36 of the GW 3, the assigning unit 46A of the control unit 46 refers to the prediction difficulty level table 52 and generates a first prediction difficulty level ranking of the prediction difficulty levels of the devices 2 that have the data attributes to be real-time attributes and that do not include a memory medium (Step S61). In the example illustrated in FIG. 16, the first prediction difficulty level ranking is in the order of the devices B, C, D, and A. Then, the assigning unit 46A adds, to the first prediction difficulty level ranking, other devices 2, that is, the devices 2 that have non-real-time attributes and that do not include a memory medium; and generates a second prediction difficulty level ranking (Step S62). In the example illustrated in FIG. 16, the second prediction difficulty level ranking is in the order of the devices B, C, D, A, and E.

The assigning unit 46A specifies the device 2 that is topmost in the second prediction difficulty level ranking (Step S63). The assigning unit 46A refers to the attribute table 51 and determines whether or not the data attributes of the specified device 2 are real-time attributes (Step S64). If the data attributes of the specified device 2 are real-time attributes (Yes at Step S64), then the assigning unit 46A assigns the notification timing of the specified device 2 to the available slot that is before the specified timing as well as closest to the specified timing (Step S65). Then, the assigning unit 46A determines whether or not the device 2 ranked next in the second prediction difficulty level ranking is present (Step S66).

If the device 2 ranked next in the second prediction difficulty level ranking is present (Yes at Step S66), then the assigning unit 46A specifies the device 2 ranked next in the second prediction difficulty level ranking (Step S67). Subsequently, the system control returns to Step S64, and the assigning unit 46A determines whether or not the data attributes of the specified device 2 are real-time attributes.

Meanwhile, if the data attributes of the specified device 2 are not real-time attributes (No at Step S64), then the assigning unit 46A determines whether or not a memory medium is installed in the specified device 2 (Step S68). If there is no memory medium in the specified device 2 (No at Step S68), then the assigning unit 46A determines whether or not the available slot closest to the specified timing is both present before the specified timing and present after the specified timing (Step S69). If the available slot is both present before the specified timing and present after the specified timing (Yes at Step S69), then the assigning unit 46A sets the notification timing at the available slot that is after the specified timing as well as closest to the specified timing (Step S70). Then, the system control returns to Step S66, and it is determined whether or not the device 2 ranked next is present.

Meanwhile, if the available slot is not both present before the specified timing and present after the specified timing (No at Step S69), then the assigning unit 46A sets the notification timing to the available slot that is closest to the specified timing (Step S71). Then, the system control returns to Step S66, and it is determined whether or not the device 2 ranked next is present. Meanwhile, if the specified device 2 includes a memory medium (Yes at Step S68), then the system control returns to S70 and the assigning unit 46A sets the notification timing to the available slot that is after the specified timing as well as closest to the specified timing. Meanwhile, if the device 2 ranked next is not present (No at Step S66), then the assigning unit 46A ends the operations illustrated in FIG. 15.

The GW 3 generates the first prediction difficulty level ranking for the devices 2 that have the data attributes to be real-time attributes and that do not include a memory medium. Moreover, the GW 3 adds, to the first prediction difficulty level ranking, the remaining devices 2 and generates the second prediction difficulty level ranking. Then, in descending order of the second prediction difficulty level ranking, when the data attributes of the specified device 2 are real-time attributes, the GW 3 assigns the notification timing of the specified device 2 to the available slot that is before the specified timing as well as closest to the specified timing. As a result, when the device 2 is high in the second prediction difficulty ranking and has data attributes to be real-time attributes, measurement is performed before the specified timing but at a timing that is as close to the specified timing as possible. Hence, it becomes possible to secure highly accurate measurement data.

When the specified device 2 has the data attributes to be non-real-time attributes and includes a memory medium and when the available slot closest to the specified timing is both present before the specified timing and present after the specified timing, the GW 3 assigns the notification timing of the specified device 2 to the available slot that is after the specified timing as well as closest to the specified timing. As a result, since the device 2 includes a memory medium and has the data attributes to be non-real-time attributes, it becomes possible to secure the notification timing that is after the specified timing and that is as close to the specified timing as possible. This allows the GW 3 assigns the notification timing of the other devices that have real-time attributes or not have a memory medium to the available slot that is before the specified timing as well as closest to the specified timing.

When the specified device has the data attributes to be non-real-time attributes and does not include a memory medium and when the available slot closest to the specified timing is both present before the specified timing and present after the specified timing, the GW 3 assigns the notification timing of the specified device 2 to the available slot that is after the specified timing as well as closest to the specified timing. As a result, since the device 2 does not include a memory medium and has the data attributes to be non-real-time attributes, it becomes possible to secure the notification timing that is after the specified timing and that is as close to the specified timing as possible.

When the specified device 2 has the data attributes to be non-real-time attributes and does not include a memory medium and when the available slot closest to the specified timing is not both present before the specified timing and present after the specified timing, the GW 3 assigns the notification timing of the specified device 2 to the available slot that is closest to the specified timing. As a result, since the device 2 includes a memory medium and has the data attributes to be non-real-time attributes, it becomes possible to secure the notification timing that is as close to the specified timing as possible.

Figure 16:
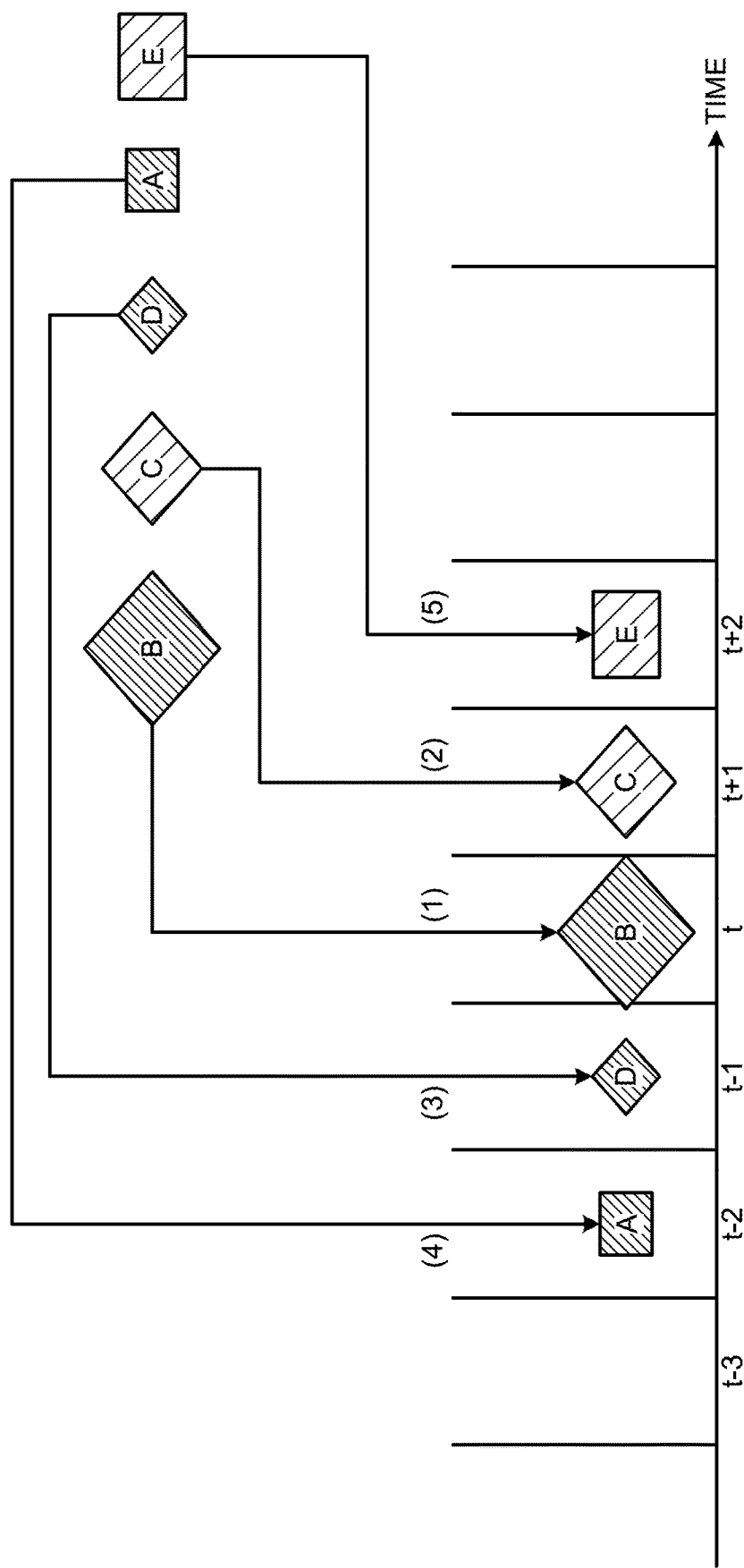
FIG. 16 is an explanatory diagram illustrating an example of a timing assignment operation performed by each device according to a third embodiment.

FIG. 16 is an explanatory diagram illustrating an example of a timing assignment operation performed by each device 2 according to the third embodiment. Herein, for the purpose of illustration, it is assumed that the device A has the data attributes to be real-time attributes and has a built-in memory medium; it is assumed that the device B has the data attributes to be real-time attributes and does not include a memory medium; it is assumed that the device C has the data attributes to be non-real-time attributes and does not include a memory medium; it is assumed that the device D has the data attributes to be real-time attributes and does not include a memory medium; and it is assumed that the device E has the data attributes to be non-real-time attributes and has a built-in memory medium. Moreover, the second prediction difficulty level ranking is assumed to be in the order of the devices B, C, D, A, and E.

The GW 3 performs the third timing assignment operation, and assigns the notification timing of the device B to the available slot at the specified timing t and assigns the notification timing of the device C to the available slot at the specified timing t+1. Moreover, the GW 3 assigns the notification timing of the device D to the available slot at the specified timing t−1 and assigns the notification timing of the device A to the available slot at the specified timing t−2. Furthermore, the GW 3 assigns the notification timing of the device E to the available slot at the specified timing t+2.

In the third embodiment, the GW 3 generates the first prediction difficulty level ranking for the devices 2 that have the data attributes to be real-time attributes and that do not include a memory medium. Moreover, the GW 3 adds, to the first prediction difficulty level ranking, the remaining devices 2 and generates the second prediction difficulty level ranking. Then, in descending order of the second prediction difficulty level ranking, when the data attributes of the specified device 2 are real-time attributes, the GW 3 assigns the notification timing of the specified device 2 to the available slot that is before the specified timing as well as closest to the specified timing. As a result, when the device 2 is high in the second prediction difficulty ranking and has data attributes to be real-time attributes, measurement is performed before the specified timing but at a timing that is as close to the specified timing as possible. Hence, it becomes possible to secure highly accurate measurement data. Besides, it becomes possible to prevent data loss and data delay.

When the specified device 2 has the data attributes to be non-real-time attributes and includes a memory medium and when the available slot closest to the specified timing is both present before the specified timing and present after the specified timing, the GW 3 assigns the notification timing of the specified device 2 to the available slot that is after the specified timing as well as closest to the specified timing. As a result, since the device 2 includes a memory medium and has the data attributes to be non-real-time attributes, it becomes possible to secure the notification timing that is after the specified timing and that is as close to the specified timing as possible.

When the specified device 2 has the data attributes to be non-real-time attributes and includes a memory medium, the GW 3 assigns the notification timing of the specified device 2 to the available slot that is after the specified timing as well as closest to the specified timing. As a result, since the device 2 includes a memory medium and has the data attributes to be non-real-time attributes, it becomes possible to secure the notification timing that is after the specified timing and that is as close to the specified timing as possible.

When the specified device 2 has the data attributes to be non-real-time attributes and does not include a memory medium and when the available slot closest to the specified timing is not both present before the specified timing and present after the specified timing, the GW 3 assigns the notification timing of the specified device 2 to the available slot that is closest to the specified timing. As a result, since the device 2 does not include a memory medium and has the data attributes to be non-real-time attributes, it becomes possible to secure the notification timing that is as close to the specified timing as possible.

Meanwhile, in the first to third embodiments, the GW 3 assigns the notification timing of each device 2 based on the prediction difficulty level ranking. However, alternatively, after varying the notification timings of the devices 2 based on the prediction difficulty level ranking obtained at the time of activation of the sensor system 1, the GW 3 can appropriately vary the notification timings of the devices 2 according to the changes in the condition during the operations. Regarding an embodiment for such a case, a fourth embodiment is described below.

[d] Fourth Embodiment

Figure 17:
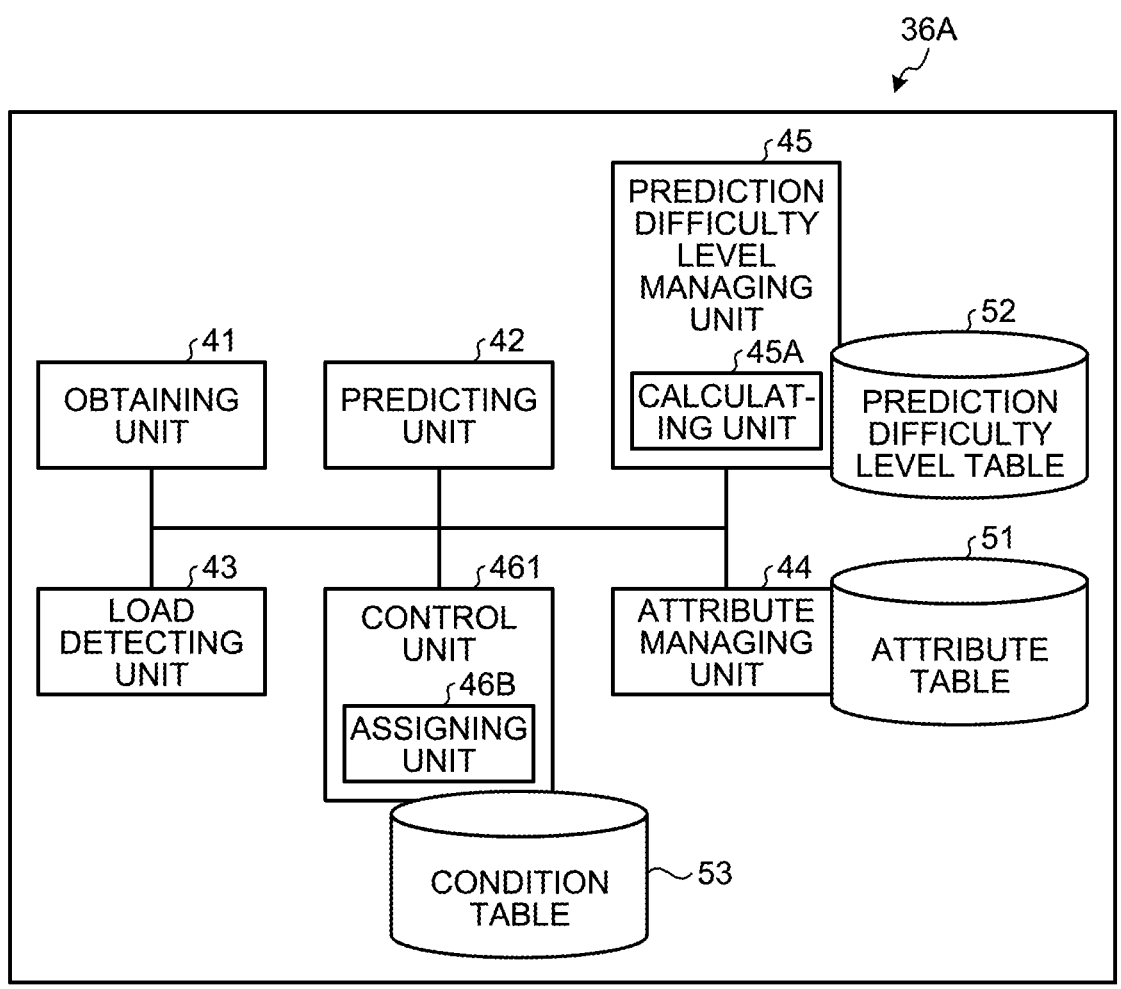
FIG. 17 is an explanatory diagram illustrating an exemplary functional configuration of a CPU of the GW according to a fourth embodiment.

FIG. 17 is an explanatory diagram illustrating an exemplary functional configuration of a CPU 36A of the GW 3 according to the fourth embodiment. The CPU 36A includes the obtaining unit 41, the predicting unit 42, the load detecting unit 43, the attribute managing unit 44, the prediction difficulty level managing unit 45, and a control unit 461. Moreover, the control unit 461 includes an assigning unit 46B. The memory 35 is used to store a condition table 53 in addition to storing the attribute table 51 and the prediction difficulty level table 52.

Figure 18:
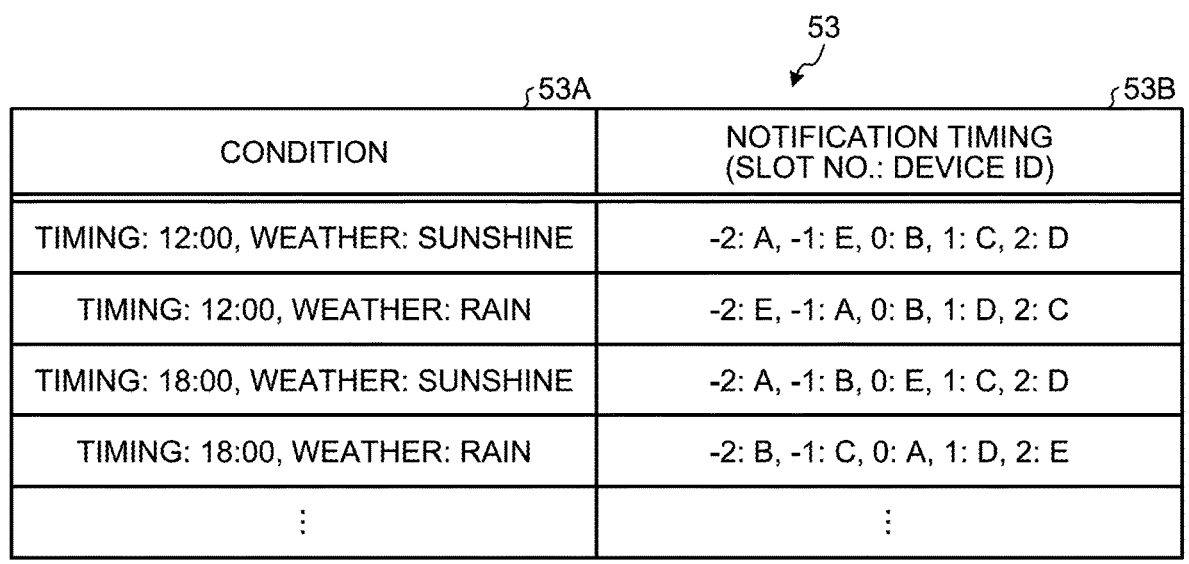
FIG. 18 is an explanatory diagram illustrating an exemplary configuration of a condition table.

FIG. 18 is an explanatory diagram illustrating an exemplary configuration of the condition table 53. In the condition table 53, conditions 53A and notification timings 53B are stored in a corresponding manner. The conditions 53A indicate the timing and the weather, such as 12:00: sunshine and 12:00: rain. The notification timings 53B represent device IDs that enable identification of the devices 2 having the notification timings at the slot IDs that enable identification of communication slots. When the current condition indicates the timing as "12:00" and the weather as "sunshine", the assigning unit 46B of the control unit 461 obtains the communication timings (in the order of the devices A, E, B, C, and D) corresponding to that condition from the condition table 53. Then, based on the obtained communication timings, the assigning unit 46B notifies each device 2 about the corresponding notification timing. When the current condition indicates the timing as "18:00" and the weather as "rain", the assigning unit 46B of the control unit 461 obtains the communication timings (in the order of the devices B, C, A, D, and E) corresponding to that condition from the condition table 53. Then, based on the obtained communication timings, the assigning unit 46B notifies each device 2 about the corresponding notification timing.

Figure 19:
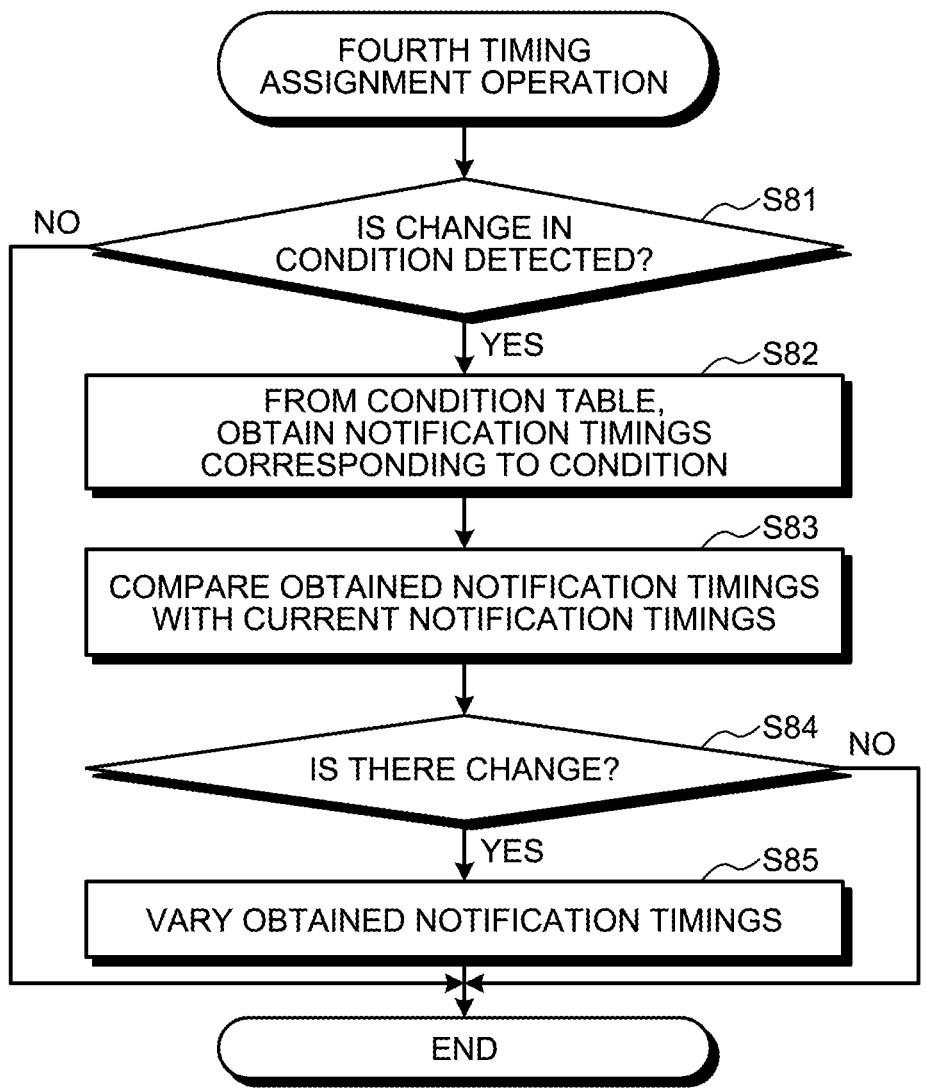
FIG. 19 is a flowchart for explaining an example of the operations that are related to a fourth timing assignment operation and that are performed by the CPU of the GW.

FIG. 19 is a flowchart for explaining an example of the operations that are related to a fourth timing assignment operation and that are performed by the CPU 36A of the GW 3. In the CPU 36A, the assigning unit 46B of the control unit 461 determines whether or not any change in the condition is detected (Step S81). Herein, the assigning unit 46B detects the current condition and detects any change in the condition from the changes between the current condition and the condition being set. If any change in the condition is detected (Yes at Step S81), the assigning unit 46B obtains the notification timings corresponding to the current condition from the condition table 53 (Step S82).

The assigning unit 46B compares the obtained notification timings and the current notification timings (Step S83) and, based on the comparison result, determines whether or not there is any change in the notification timings (Step S84). Meanwhile, it is the assigning unit 46B that manages the current notification timings. If there is any change in the notification timings (Yes at Step S84), then the assigning unit 46B varies the obtained notification timings (Step S85) and ends the operations illustrated in FIG. 19.

If there is no change in the notification timings (No at Step S84), then the assigning unit 46B ends the operations illustrated in FIG. 19. Meanwhile, if no change in the condition is detected (No at Step S81), then the assigning unit 46B ends the operations illustrated in FIG. 19.

In the fourth embodiment, when any change in the condition is detected, the GW 3 obtains the notification timings corresponding to the condition from the condition table 53; compares the obtained notification timings and the notification timings being set; and, if there is any change in the obtained notification timings, varies the current notification timings. As a result, during the operations, the GW 3 can vary the notification timings according to the current condition and without having to take into consideration the prediction difficulty levels.

In the sensor system 1 according to the embodiments described above, wireless communication is established between the devices 2 and the GWs 3. Alternatively, for example, it is possible to implement near-field wireless communication such as wireless local area network (LAN) communication using Bluetooth (registered trademark) or Wi-Fi (registered trademark); or normal wireless communication; or wired communication. Moreover, although wired communication is performed between the GWs 3 and the server 4, it is possible to have various modifications such as wireless LAN communication.

The GWs 3 according to the embodiments described above can be implemented using, for example, tablet terminals or smartphones. The server 4 too can be implemented using, for example, a tablet terminal or a smartphone. Thus, it is possible to have various modifications. Moreover, the functions of the GWs 3 can be alternatively implemented by the server 4. Thus, it is possible to have various modifications.

The application 5 according to the embodiments described above obtains the measurement data of the devices 2 from the server 4. Alternatively, the application 5 can obtain the measurement data of the devices 2 from the GWs 3. Thus, it is possible to change the settings.

In the embodiments described above, the notification timing of each device 2 is assigned to an available slot that is obtained by time-sharing into a predetermined time interval. However, if it is difficult for the volume of the measurement data of the device 2 to be transmitted within a single slot, then two slots are assigned for the notification timing of that device 2.

The constituent elements of the device illustrated in the drawings are merely conceptual, and need not be physically configured as illustrated. The constituent elements, as a whole or in part, can be separated or integrated either functionally or physically based on various types of loads or use conditions.

Moreover, some or all of various processing functions implemented in the devices can be implemented in a central processing unit (CPU), a digital signal processor (DSP), or a field programmable gate array (FPGA). Alternatively, some or all of various processing functions can be implemented using computer programs analyzed and executed by a CPU or can be implemented in hardware using wired logic.

The area for storing a variety of information can be configured using, for example, a random access memory (RAM) such as a read only memory (ROM), a synchronous dynamic random access memory (DRAM), a magnetoresistive random access memory (MRAM), or a nonvolatile random access memory (NVRAM).

As an aspect of the present invention, it becomes possible to prevent data loss and data delay.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising a processor configured to:
obtain measurement data from a plurality of devices;
predict prediction data of a specified timing using the obtained measurement data;
calculate, for each of the devices, an error between the measurement data and the prediction data; and
assign, based on the error for each of the devices, a notification timing for each of such devices for which there is overlapping of timing of notifying the measurement data of the specified timing.

2. The control device according to claim 1, wherein, when there are more than a predetermined number of the such devices for which there is overlapping of timing of notifying the measurement data of the specified timing, the processor is further configured to assign the notification timing to each of the such devices based on the error.

3. The control device according to claim 1, wherein, to a first device having data attributes to be real-time attributes from among the such devices for which there is overlapping of timing of notifying the measurement data of the specified timing, the processor is further configured to assign the notification timing that is before the specified timing.

4. The control device according to claim 3, wherein, to a second device having the error to be large from among the such devices for which there is overlapping of timing of notifying the measurement data of the specified timing, the processor is further configured to assign the notification timing that is close to the specified timing.

5. The control device according to claim 3, wherein, from among the such devices for which there is overlapping of timing of notifying the measurement data of the specified timing, regarding a third device that includes a memory medium capable of storing the measurement data and that has the data attributes not to be the real-time attributes, the processor is further configured to instruct the third device to perform measurement at the specified timing and assign the notification timing that is after the specified timing to the third device.

6. A control method comprising:
obtaining measurement data from a plurality of devices;

predicting prediction data of a specified timing using the obtained measurement data;

calculating, for each of the devices, an error between the measurement data and the prediction data; and assigning, based on the error for each of the devices, a notification timing for each of such devices for which there is overlapping of timing of notifying the measurement data of the specified timing.

7. A non-transitory computer-readable recording medium having stored therein a control program that causes a computer to execute a process comprising:

obtaining measurement data from a plurality of devices;

predicting prediction data of a specified timing using the obtained measurement data;

calculating, for each of the devices, an error between the measurement data and the prediction data; and assigning, based on the error for each of the devices, a notification timing for each of such devices for which there is overlapping of timing of notifying the measurement data of the specified timing.

* * * * *